Feb. 26, 1963

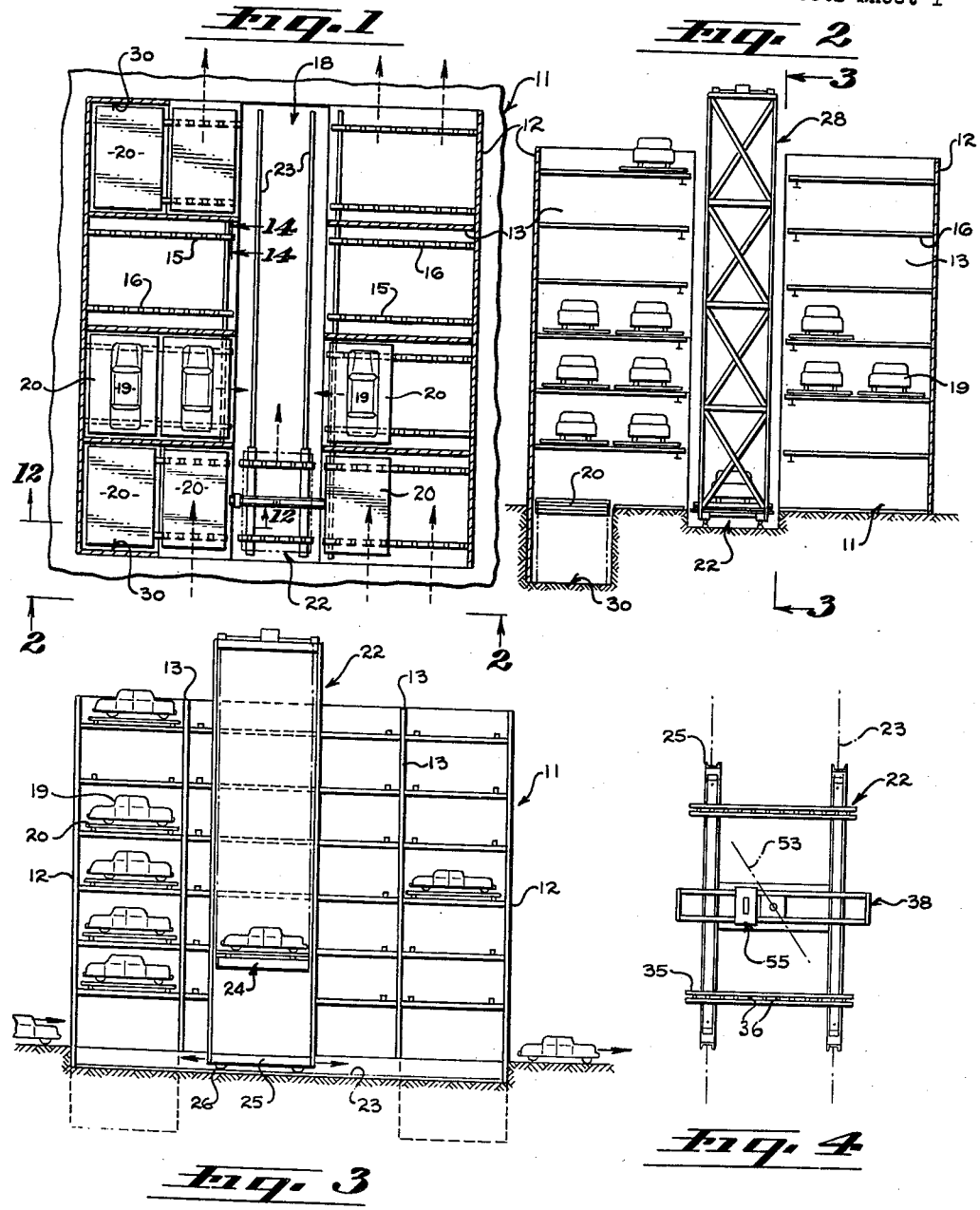

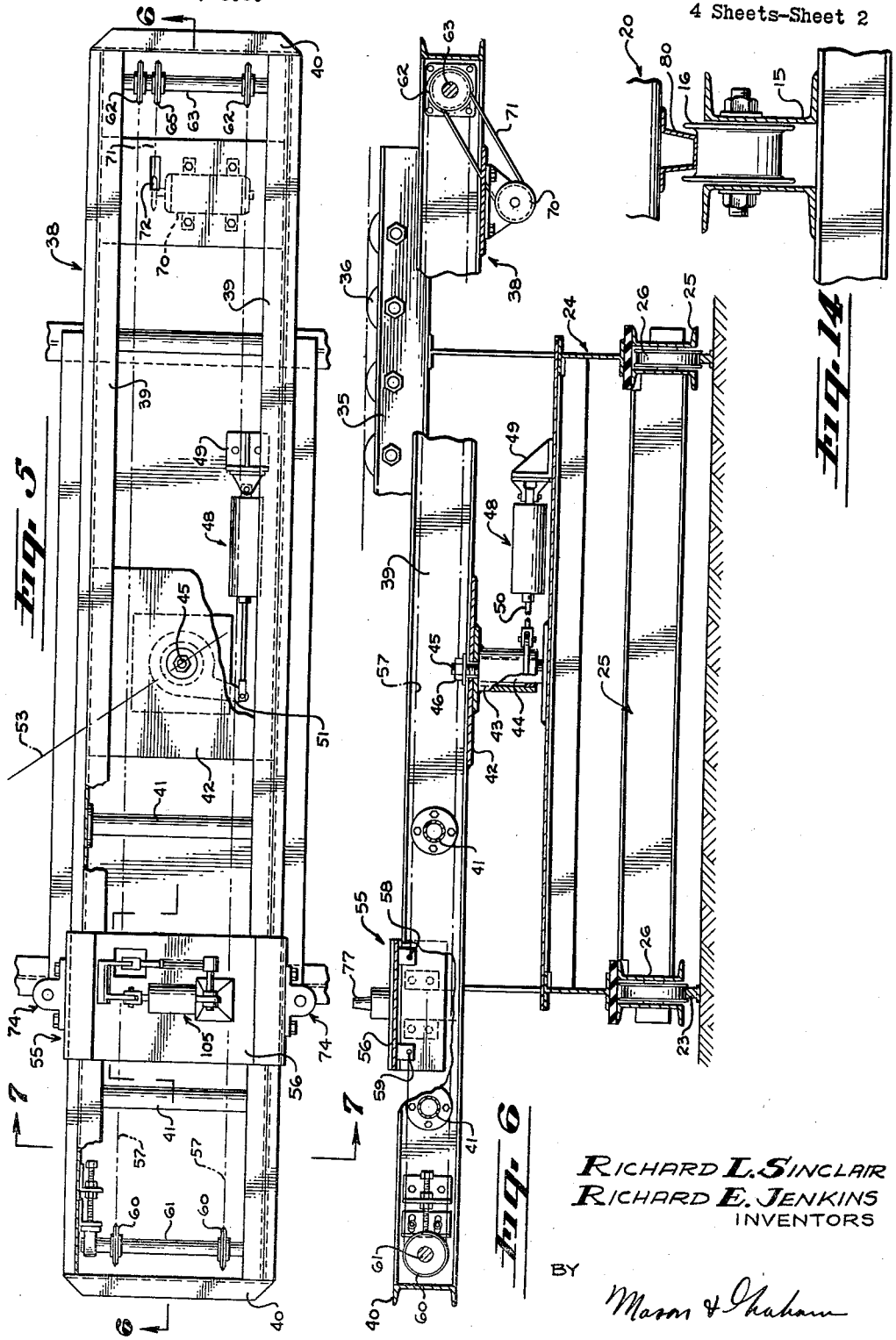

R. L. SINCLAIR ETAL 3,079,015

AUTOMOBILE PARKING APPARATUS

Filed Nov. 9, 1959

RICHARD L. SINCLAIR
RICHARD E. JENKINS
INVENTORS

BY

*Mason & Graham*

ATTORNEYS

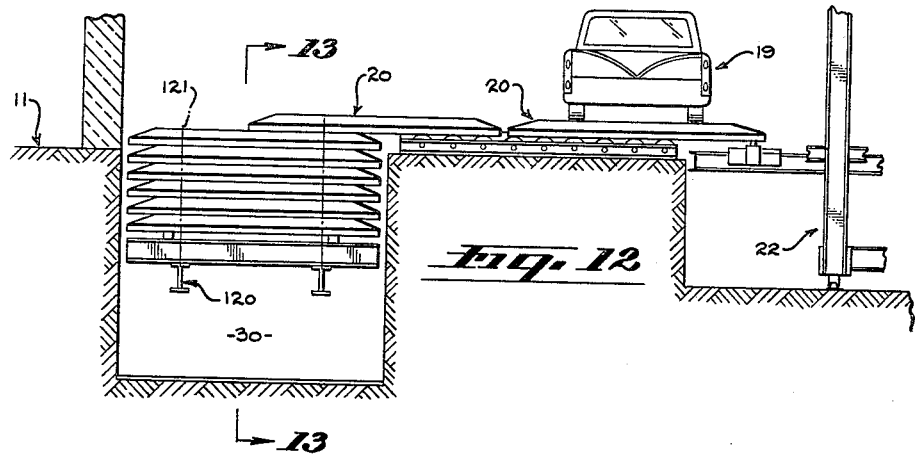
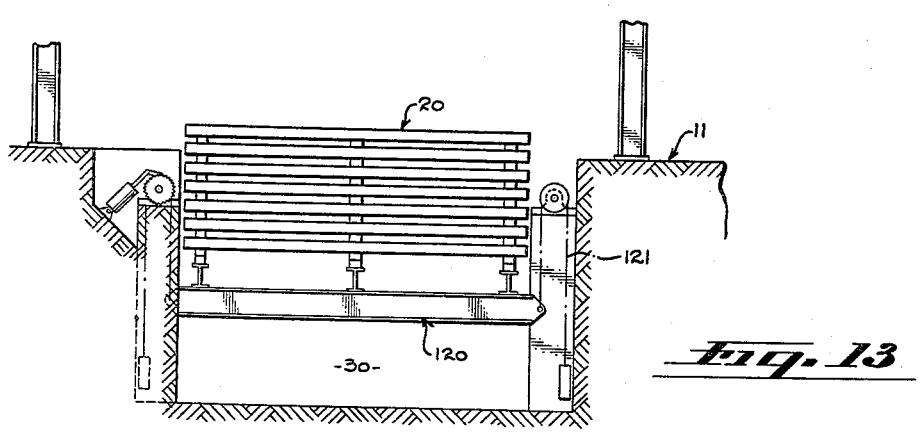
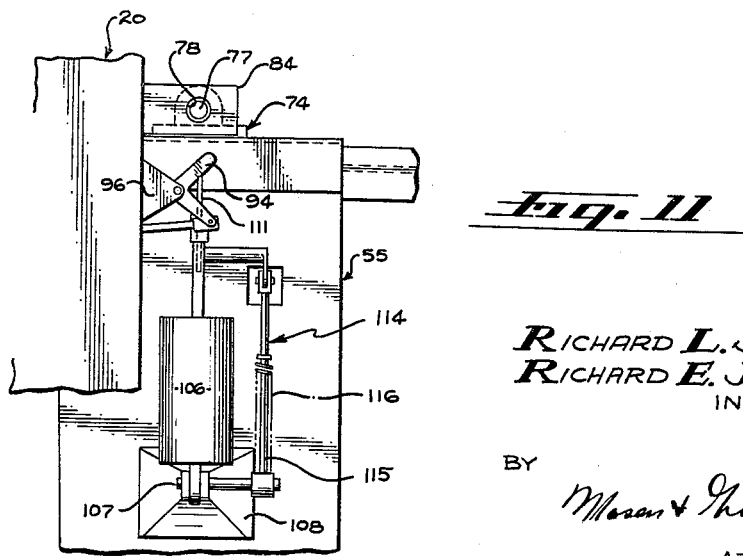

United States Patent Office 3,079,015
Patented Feb. 26, 1963

3,079,015
AUTOMOBILE PARKING APPARATUS
Richard L. Sinclair, Garden Grove, and Richard E. Jenkins, Los Angeles, Calif.; said Jenkins assignor to said Sinclair
Filed Nov. 9, 1959, Ser. No. 851,752
3 Claims. (Cl. 214—16.1)

This invention has to do with buildings and apparatus for the parking and storage of motor vehicles, specifically automobiles, and other goods. The invention relates particularly to buildings and apparatus of the type wherein each motor vehicle is transported to and from a storage space.

Conventionally, in the storage of automobiles, the vehicles are moved endwise, forwardly and/or rearwardly, into and out of parking stalls or storage spaces. Where space is limited the advantages of being able to move an automobile sidewise or laterally into and out of storage spaces are obvious and attempts have been made to do this but, so far as we know, these have not proved commercially feasible.

It therefore is an object of the invention to provide novel means for handling motor vehicles, particularly automobiles, in a manner such that the individual automobile is moved from a point of entry to a storage space and then moved laterally, or sidewise, into the storage space, and to provide such means for removing the automobile from the stall or area by moving it sidewise.

A further object is to provide novel apparatus of the type indicated embodying a platform upon which a single automobile is supported, together with novel means for transporting the platform with the automobile thereon to and from a storage space and for moving the platform and automobile sidewise into and out of a storage space.

A still further object is to provide novel apparatus of the type indicated for storing the automobile supporting platforms when the same are not in use.

Another object is to provide an elevator or movable carriage provided with novel means for handling a load-supporting platform adapted to move the platform off the elevator or carriage to a storage space located beyond the elevator or carriage and to retrieve such a platform from the storage space.

Another object is to provide a platform of the type indicated embodying novel means for coupling one platform to another whereby to enable the movement of two platforms simultaneously and thus permit one platform to be moved onto the carriage as another is moved off, or to permit shifting or retrieving of a platform as required.

A further object of the invention is to provide novel means on an elevator or carriage adapted for releasably engaging a platform and moving the same.

These and other objects will be apparent from the drawings and the following description. Referring to the drawings:

FIG. 1 is a diagrammatic plan view of the ground level floor of a building embodying means of the invention;

FIG. 2 is a diagrammatic end elevational view of the building of FIG. 1 and apparatus therein taken on line 2—2 of FIG. 1;

FIG. 3 is a sectional view on line 3—3 of FIG. 2;

FIG. 4 is a diagrammatic plan view of the elevator employed to transport the platforms;

FIG. 5 is a fragmentary plan view of the central portion of the elevator or carriage of FIG. 4 showing the means for releasably engaging and moving the platform supported on the elevator;

FIG. 6 is a fragmentary sectional view on line 6—6 of FIG. 5;

FIG. 11 is an enlarged fragmentary plan view of the platform coupling mechanism operating means;

FIG. 12 is a sectional view on line 12—12 of FIG. 1 but on a larger scale;

FIG. 13 is a sectional view on line 13—13 of FIG. 12; and

FIG. 14 is an enlarged cross sectional view on line 14—14 of FIG. 1.

Figure 7:
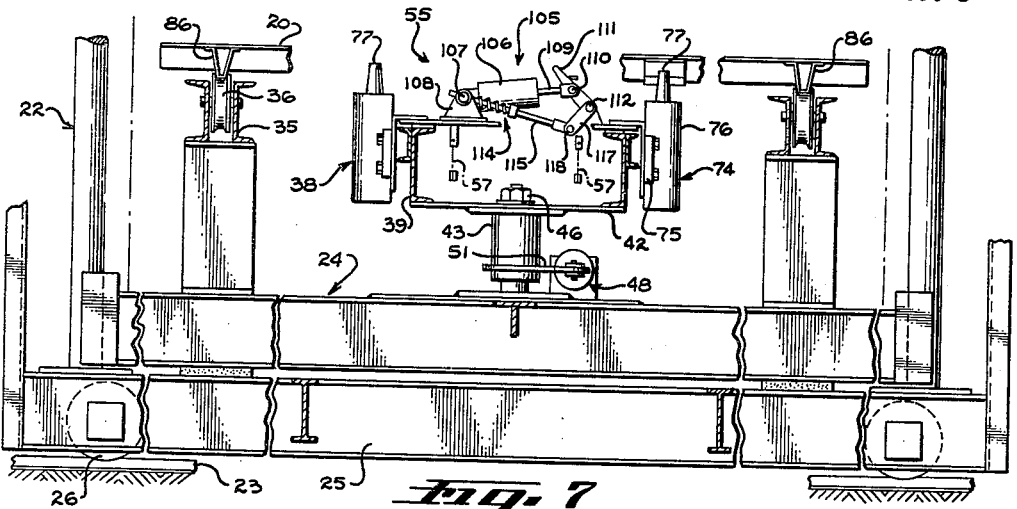
FIG. 7 is a cross sectional view on line 7—7 of FIG. 5.

More particularly describing the invention, referring first to FIGS. 1-3, we show a building 11 having side walls 12 and a plurality of vertical partition walls 13 dividing the interior into a plurality of areas for the storage of automobiles or other goods. It will be assumed that the building is designed for the storage of automobiles and the apparatus will be specifically described with reference thereto.

While the building may be provided with a plurality of superposed floors of conventional construction, this is not essential and in place thereof we show a plurality of vertically spaced pairs of parallel beams 15 upon which are mounted a plurality of flanged rollers 16. In the particular building shown each floor level space between partition walls is designed to accommodate two automobiles between the side wall and a central open area 18 which extends both longitudinally and vertically of the building. The automobiles 19 are supported individually upon platforms 20 and these in turn are supported in a storage space upon rollers 16 of a pair of beams 15. We provide a traveling elevator 22 which is mounted on rails 23 for movement from one end to the other of the central area 18. The elevator includes a movable deck or frame 24 which can be raised and lowered with respect to the main bed or frame 25 of the elevator, the latter having wheels 26 which run upon the rails 23. The elevator is shown as having a superstructure 28, and it is intended that suitable conventional means may be employed for raising and lowering the elevator deck or frame 24.

At each end of the building, at one corner thereof, we provide a storage pit 30 for the reception of platforms 20 which are not in use.

Briefly, in the operation of the apparatus, an automobile is driven onto a platform 20 which may be located on the ground floor to either side of the central space 18. Subsequently means on the elevator 22 is actuated to move the platform with the automobile thereon on to the elevator. The elevator is then moved to a position opposite and in registration with one of the storage spaces and the platform moved off the elevator and into the storage space, the platform and automobile remaining together at all times. Subsequently another automobile and platform may be moved into the same storage space by moving the first platform over to accommodate the second platform. Means are also provided for retrieving the platform farthest from the elevator, as will later appear.

Referring now to FIGS. 4-14 inclusive for a more detailed description of the apparatus, and referring first to the elevator and the means carried thereby for moving the individual platform 20 into and out of the storage spaces, the movable frame 24 of the elevator is provided with a pair of transversely extending beams 35 which carry rollers 36 similar to those found in the storage spaces and the two beams 35 are adapted to register with the beams 16 in any one of the storage spaces when the elevator is properly positioned opposite the space. The platform 20 is supported upon the rollers 36 when on the elevator.

For the purpose of releasably engaging a platform whether on the elevator or in a storage space with which the elevator is in registration, we provide a pivotally mounted swingable frame designated generally by 38. This includes side members 39, end members 40, and cross members 41. A central bottom plate assembly 42 is provided with a depending cylindrical journal member 43 which rests upon and is rotatably associated with an upwardly projecting cylindrical pin 44 of the frame 24. The parts are secured by a threaded stud 45 and nut 46. The positioning of the frame is controlled by a piston-cylinder assembly 48 which is pivotally secured at one end to a bracket 49 on elevator frame 24 and pivotally secured at its other end to an arm 51 fixed to the journal cylinder 43.

The swingable frame 38 is shown disposed tranversely of the elevator in FIGS. 1, 4 and 5, which is the position it occupies when a platform is being moved onto or off of the elevator. However, by the mechanism described in the previous paragraph, the frame may be swung to an out-of-the-way angular position along the axis indicated by the line 53 to enable the elevator to be moved along the rails 23 and vertically without danger of the end portions of the frame stricking any object.

The frame 38 is provided with a platform-engaging and moving means, designated generally 55, which includes a carriage 56 movable longitudinally along the frame. The carriage is moved selectively in either direction by means of a pair of chains 57 attached at their ends at 58 and 59 to the carriage and trained around sprockets 60 upon a shaft 61 mounted adjacent one end of the frame 38 and sprockets 62 fixed to a shaft 63 journaled adjacent the other end of the frame. The latter shaft carries a fixed sprocket 65 which is driven by a reversible electric motor 70 through the medium of a chain 71 trained about the sprocket 65 and a sprocket 72 fixed to the motor shaft.

The carriage 56 includes a pair of platform-engaging assemblies 74 carried outboard at opposite sides of the carriage upon suitable brackets 75. Each assembly includes an upright cylinder 76 containing a piston having an upwardly projecting piston pin 77. The two pins 77 are adapted to be raised for reception in holes 78 provided at each side of the platform 20, as will be described.

Figure 8:
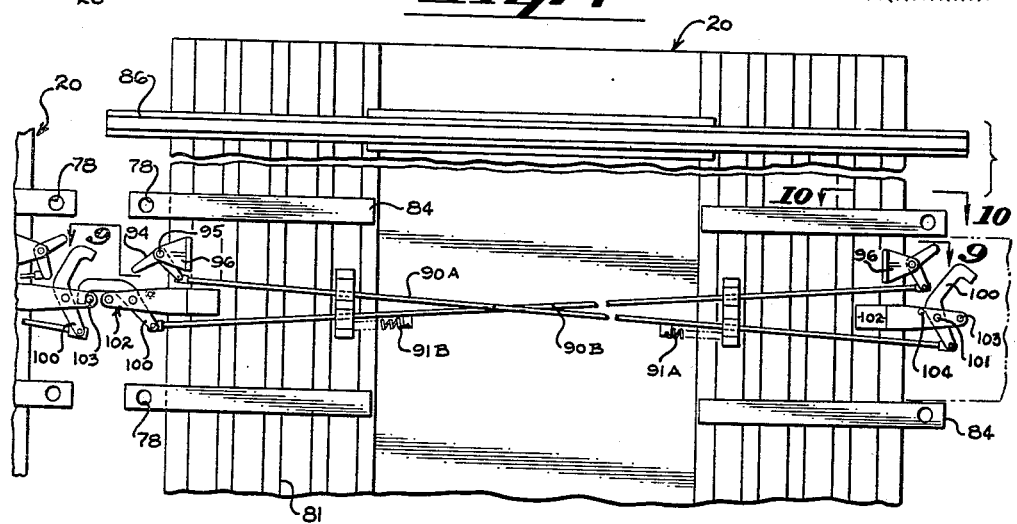
FIG. 8 is an inverted fragmentary plan view of a platform and a portion of another platform coupled thereto.
Figure 9:
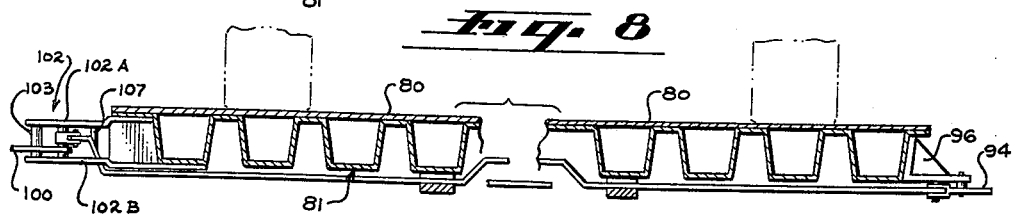
FIG. 9 is a sectional view on line 9—9 of FIG. 8.
Figure 10:
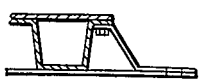
FIG. 10 is a fragmentary sectional view on line 10—10 of FIG. 8.

Referring now particularly to FIGS. 7, 8 and 9 for a description of a platform 20, this includes a deck plate 80 providing a flat upper surface for the reception of an automobile or the like. Plate 80 is reinforced on its under side from end to end in a region at each side by a corrugated plate 81 welded thereto, thereby strengthening the plate 80 beneath portion which is traversed by and supports the wheels of a vericle. A pair of drawbars 84 are mounted at each side of the platform beneath plate 81, and these project somewhat beyond the edges of the plates 80 and 81, being provided with the aforementioned holes 78.

Each platform is also provided with a pair of laterally spaced parallel runners 86 which also project beyond the lateral edges of the plates 80 and 81. These runners are spaced apart a distance corresponding to the lateral spacing of the platform supporting rollers 36 upon the elevator and the rollers 16 in the individual storage spaces, so that the platform can be supported as well as moved with the runners bearing upon the rollers 36 and/or 16.

In order to permit of the coupling of one platform to another, each platform is provided with a pair of crossed, transversely extending coupling rods which are biased or yieldably uged in opposite directions by springs 91. Each rod is connected at one end to a bell crank 94 which is pivotally mounted at 95 upon a bracket 96 adjacent the side of the platform. At its other end each rod is pivotally connected to a coupling hook 100, which is pivotally mounted at 101 in a centrally positioned bracket 102. The springs 91 serve to urge the rods in a direction such that the hooks are held retracted in the position in which the hook at the right side of FIG. 8 is shown. By pivoting a bell crank 94, the hook 100 at the opposite side of the platform can be moved to a coupling position for engagement with the pin 103 of an adjacent platform. In this connection it may be pointed out that each bracket 102 includes vertically spaced plates 102a and 102b between which the coupling pin 103 extends. A pin 104 limits movement of the hook 100.

The coupling assembly of one of an adjacent pair of platforms is operated by means on the elevator, designated generally 105, capable of actuating a bell crank of a platform adjacent the elevator. The means 105 comprises a cylinder 106 which is pivotally mounted at 107 on a bracket 108 on carriage 55. A piston rod 109 projects from a piston in the cylinder and is pivotally connected at 110 below the upper end of a bell crank operating lever 111. The latter is pivotally mounted on the carriage at 112. A spring toggle assembly 114 tends to hold the lever in either extended or retracted position, and this includes telescoping link 115 and its expanding spring 116, and an arm 117 fixed to lever 110, and the pivotal connection 118. The telescoping link 115 is pivotally secured to bracket 108.

It will be apparent that, when the elevator is adjacent a platform 20, or when a platform is on the elevator, the means 105 can be operated to cause lever 111 thereof to engage and rotate the bell crank 94 of such a platform to operate the coupling hook at the opposite side of the platform for engagement with an adjacent platform. It is of course necessary that carriage 55 be properly positioned with respect to the platform, and preferably the platform-engaging pins are first caused to enter the holes 78 of the platform, since this not only insures proper positioning, but also locks the platform and carriage together.

Referring now to FIGS. 1, 2 and 12–14, we provide one or more pits 30 for the storage of the platforms 20 when they are not in use. For convenience, a storage pit is shown at the entrance end and another at the exit end of the building. Each pit is preferably provided with a mechanism for supporting a plurality of the plates in superposed position and with means for selectively raising or lowering the stored plates by an amount equal to the thickness of one plate to enable a plate to be added to or removed from the stack of plates as occasion requires. By way of illustration we show a frame 120 supported for vertical movement upon cables 121. Any suitable means 121 can be used to selectively raise or lower the frame by an amount equal to the thickness of a plate, each time the means is operated.

In the operation of the apparatus, one or more platforms 20 would normally be provided at the entrance end of the building laterally adjacent the elevator, as positioned in FIG. 1, and the automobiles to be parked would be driven upon these platforms. In due course, the elevator or platform carrier, as it may be called, would be operated to pull one of the platforms and its automobile load onto the elevator. During this operation, the frame 38 is positioned normal or at right angles to the longitudinal axis of the elevator, as it is shown in FIGS. 1, 4, and 5. Subsequently the frame 38 is turned so that it will lie along the broken line 53 of the same figures, thereby swinging the frame to a retracted or out-of-the-way position wherein the ends of the frame do not project objectionably far laterally of the elevator where they might hit objects as the elevator is moved. The elevator then is moved to registration with the desired storage space, the frame 38 swung to the transverse position, and the platform and its load moved from the elevator onto the supporting rollers 16 of the chosen storage space.

In retrieving an automobile from a storage space, the platform with the automobile thereon would be deposited in one of the spaces at the exit end of the building from which the automobile could be driven from its platform out of the building. The excess platforms at any time may be stored in the pits 30 and the platforms can be readily placed in the pit and retrieved therefrom by the mechanism on the elevator which enables the coupling of one platform to another, or other suitable means may be provided.

It is contemplated, of course, that each of the motive power means will be provided with a suitable source of energy—as a suitable fluid under compression in the case of the fluid-operated devices, or electricity in the case of the electric motor or the like—and that suitable controls will be provided either on the elevator or at some central point to enable a person to coordinate the operation of the various components of the apparatus.

We claim:

1. In storage means of the type described, a building providing an inner storage space and an outer storage space positioned therebehind, a motorized carrier movable to a position of registration with said inner storage space, a pair of load-supporting platforms movably supported in said storage spaces, said carrier being constructed and arranged to support a platform thereon, platform moving means on the carrier for engaging the platform in the inner storage space adjacent the carrier and moving the same onto the carrier, and releasable coupling means carried by said platforms and operable by said platform moving means for coupling said platforms together to enable movement of both as a unit.

2. A platform carrier for use as described comprising a mobile main frame body, means on said body for supporting a platform and permitting the same to be moved edgewise beyond the body, an elongated frame mounted on said body for limited pivotal movement about a vertical axis, power means on said body for pivoting said elongated frame in either direction to either of two positions, one of said positions of the elongated frame being with its longitudinal axis extending in the direction in which the platform is movable with respect to said body, and motor-driven means travellable along said elongated frame and releasably engageable with a platform for moving the same relative to said body, the motor-driven means travellable along the elongated frame includes a carriage, power-operated means on the carriage for releasably engaging a platform, and an independent power-operated means on the carriage for actuating a coupling mechanism carried by a platform.

3. A platform carrier for use as described comprising a mobile main frame body, means on said body for supporting a platform and permitting the same to be moved edgewise beyond the body, an elongated frame mounted on said body, motor-driven means travellable along said elongated frame and releasably engageable with a platform for moving the same relative to said body, said motor-driven means including a carriage, power-operated means on the carriage for releasably engaging a platform, and an independent power-operated means on the carriage for actuating a coupling mechanism carried by a platform.

References Cited in the file of this patent

UNITED STATES PATENTS

| | | |
|---|---|---|
| 703,914 | Gwyn | July 1, 1902 |
| 1,605,220 | Cuvillier et al. | Nov. 2, 1926 |
| 1,830,740 | Leech et al. | Nov. 3, 1931 |
| 2,223,962 | Mitchell | Dec. 3, 1940 |
| 2,468,470 | Spieth | Apr. 26, 1949 |
| 2,712,875 | Leopold | July 12, 1955 |
| 2,762,515 | Ingold | Sept. 11, 1956 |

FOREIGN PATENTS

| | | |
|---|---|---|
| 127,519 | Australia | May 6, 1948 |
| 486,150 | Italy | Nov. 2, 1953 |
| 833,174 | Germany | Mar. 6, 1952 |